United States Patent
Saunders

(10) Patent No.: US 6,545,998 B1
(45) Date of Patent: Apr. 8, 2003

(54) SUPPLEMENTAL SATELLITE COMMUNICATION PROCESSING

(75) Inventor: Oliver W. Saunders, Los Angeles, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/262,424

(22) Filed: Mar. 4, 1999

(51) Int. Cl.[7] .............................. H04Q 7/20; H04Q 7/38
(52) U.S. Cl. ....................... 370/347; 370/315; 370/325; 455/12.1; 455/13.1; 455/427; 455/428; 455/430; 342/353; 342/357.01; 342/357.16
(58) Field of Search ................................. 370/347, 315, 370/316, 325; 455/12.1, 11.1, 13.1, 13.3, 427, 428, 445, 430, 517, 550; 342/353, 357.01, 357.16

(56) References Cited

U.S. PATENT DOCUMENTS

| | | | |
|---|---|---|---|
| 4,375,697 A | | 3/1983 | Visher |
| 5,509,004 A | * | 4/1996 | Bishop, Jr. et al. ......... 455/12.1 |
| 5,915,217 A | * | 6/1999 | Wiedeman et al. ......... 370/316 |
| 5,920,804 A | * | 7/1999 | Armbruster et al. ....... 455/13.2 |
| 5,924,014 A | * | 7/1999 | Vanden Heuvel et al. .. 455/12.1 |
| 5,957,409 A | * | 9/1999 | Castriel et al. ............ 455/12.1 |
| 6,157,834 A | * | 12/2000 | Helm et al. ................. 370/325 |

FOREIGN PATENT DOCUMENTS

| | | |
|---|---|---|
| DE | 635698 A1 | 1/1995 |
| EP | 571740 A1 | 12/1993 |
| EP | 780998 A2 | 6/1997 |
| EP | 780998 A3 | 9/1998 |
| GB | 2134353 A | 8/1984 |

OTHER PUBLICATIONS

Taormina et al. ,Satellite System And Method Of Deploying Same, May 9, 2002, Pub. No. U.S. 2002/0053627 A1.*

* cited by examiner

Primary Examiner—William Trost
Assistant Examiner—Keith Ferguson
(74) Attorney, Agent, or Firm—McAndrews, Held & Malloy, Ltd.

(57) ABSTRACT

Apparatus for enhancing the processing capabilities of a satellite communication system including an uplink receiver 40 deployable with a first satellite 20. A first processor 50 deployable on satellite 20 is capable of processing signals from uplink receiver 40. A link terminal 60 deployable with satellite 20 is capable of receiving signals processed by a second processor from a second intersatellite communication link terminal deployable with a second satellite. A first switch 100 deployable with satellite 20 enables signals from uplink receiver 40 to be utilized by communication link terminal 60 or processor 50. A downlink transmitter 80 deployable with satellite 20 is capable of transmitting signals to a ground based communication station 90. A second switch 110 deployable with satellite 20 enables signals from communication link terminal 60 or first processor 50 to be utilized by downlink transmitter 80.

28 Claims, 1 Drawing Sheet

SUPPLEMENTAL SATELLITE COMMUNICATION PROCESSING

BACKGROUND OF THE INVENTION

This invention relates to enhancing the processing capabilities of a core satellite communication system, and more particularly relates to such a system in which supplemental processing can be performed aboard a supplemental satellite launched after the core satellite.

The long operational lifetimes of orbiting communication satellites or spacecraft present a dilemma for designers of the electronic systems included in such spacecraft. Large, high capacity spacecraft are expensive, and their associated launch costs are substantial. As a result, there is a tendency to procure the largest, longest lifetime spacecraft possible.

However, deploying spacecraft with the longest lifetime possible presents problems in the context of the present communications industry which is changing rapidly and which is expected to serve new markets and provide new services in the not too distant future. However, the details of the new markets and services are not clear and have not been defined. With spacecraft communications in such a state of flux, some consultants have publicly advised against deploying spacecraft with operational lifetimes longer than about five years.

The current preference in commercial communication spacecraft is for bent-pipe transponders. Although it appears that there will eventually be a market for digital switching (circuit or cell switching), especially in the domestic Comsat band (Ka-band), the form of such a market is not clear. There is a need for an approach which allows deployment of large, expensive spacecraft optimized for the current bent-pipe paradigm (perhaps with on-board intermediate frequency (?IF≅) switching and including an alterable basic functionality which can be changed at a future time to a new form that might not exist at the time of launch.

Communication satellites are generally deployed in a defined orbital slot which consists of a geographical location and a band of frequencies which are authorized for receipt and transmission of communication signals. The acquisition of an orbital slot requires substantial effort and expense. There is a need for communication circuit techniques which enable the investment in an orbital slot to be protected by changing the processing function of an initial core spacecraft which is assigned to the orbital slot.

There also is a need for techniques which permit a spacecraft's communication processing to be altered functionally, possibly multiple times, during its operational lifetime. The present invention enables the processing functionality to be altered with a degree of economy and ease which is not available by using any of the known prior techniques.

BRIEF SUMMARY OF THE INVENTION

One object of the present invention is to provide components which can be placed on a core or initial satellite and which enable and facilitate communication with a supplemental satellite launched after the core satellite is placed into an orbital slot.

Another object of the invention is to provide components suitable for launching on a core satellite which perform immediately upon deployment, but which facilitate communication with additional components launchable with a less expensive supplemental satellite if there is a need for a change in processing functionality of the core satellite.

Yet another object of the present invention is to provide components suitable for launching with a core satellite to allow communication with a supplemental satellite on which a new processing function can be carried out, but which does not require duplication of the uplinks and downlinks built into the core satellite.

By using a component arrangement of the foregoing type, unprocessed or semi-processes signals received by the core satellite may be routed to a supplemental satellite over an intersatellite link where they are processed. The process outputs then may be sent back to the core satellite over the intersatellite link and inserted to a downlink signal chain for downlink transmission.

In one embodiment of the invention, there is an uplink receiver which is deployable with a first satellite and which is capable of receiving communication signals from a ground based communication station. A first processor, such as a bent pipe repeater, is deployable on the first satellite and is capable of processing signals from the uplink receiver. An intersatellite communications link terminal, deployable with the first satellite, is capable of transmitting signals to a second processor deployable with a second satellite launched after the first satellite and is capable of receiving signals processed by the second processor from a second communication link terminal deployable with the second satellite. A first switch, deployable with the first satellite, enables signals from the uplink receiver to be utilized by the first intersatellite communication link terminal or the first processor. A downlink transmitter, deployable with the first satellite, is capable of transmitting signals to a ground based communication station. A second switch, deployable with the first satellite, enables signals from the first intersatellite link terminal or the first processor to be utilized by the downlink transmitter.

By employing apparatus of the foregoing type, the processor capabilities of the first satellite can be enhanced by launching the second satellite, preferably into the orbital slot of the first satellite. The new processing functionality can be performed on the second satellite and the results transmitted to the first satellite for communication through the downlink transmitter to the ground based communication station. By using apparatus and methods of the foregoing type, the processing functionality of the satellite communication system can be altered and modified with a degree of ease and economy and not available by the use of the known prior techniques.

BRIEF DESCRIPTION OF THE DRAWINGS

The foregoing advantages and features of the present invention will appear for purposes of illustration, but not of limitation, in connection with the accompanying drawing wherein like numbers refer to like parts throughout and wherein.

DETAILED DESCRIPTION OF THE INVENTION

Figure 1:
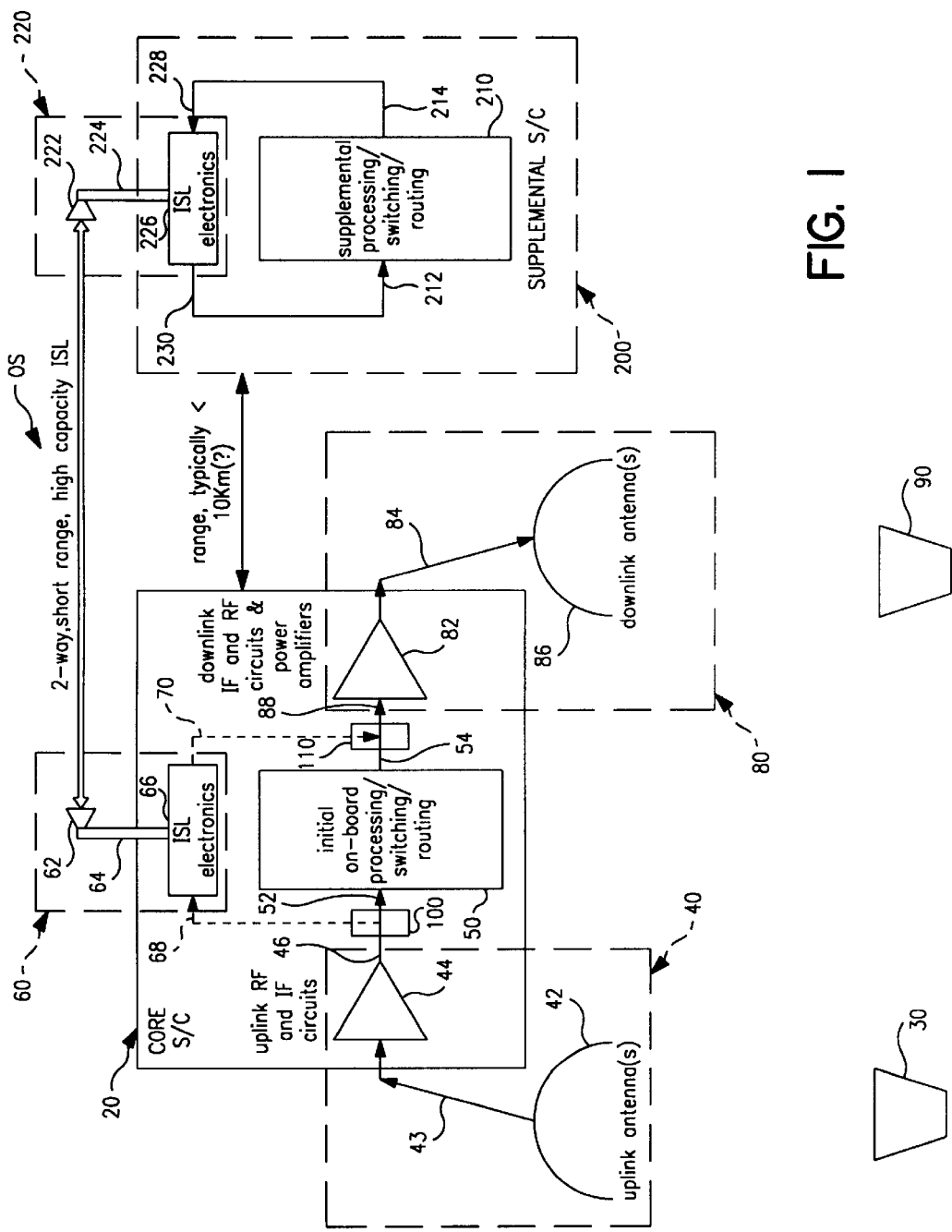
FIG. 1 is a schematic block diagram of a preferred form of satellite communication system embodying the present invention.

Referring to FIG. 1, a preferred form of the invention is deployable on a conventional core satellite 20 suitable for launching into an orbital slot OS. Radio frequency communication signals are transmitted to the satellite 20 from a conventional ground-based communication station 30. The radio signals are received by an uplink receiver 40 having an output 46 and comprising a radio frequency antenna 42 which transmits radio frequency carrier signals over a lead 43 to a a conventional converter 44 which converts the radio carrier frequency signals to intermediate frequency (IF) signals.

A processor 50 may be provided on core satellite 20 and connected as shown. The processor may be a conventional repeater transponder also known as a non-regenerative repeater or bent pipe which receives the IF signals from receiver 40 and shifts the frequency to the downlink band. In addition, processor 50 may perform onboard IF switching. Processor 50 has an input 52 and an output 54 arranged as shown.

The preferred form the invention also includes an inter-satellite communication link terminal 60 which is suitable for launching on core satellite 20. The terminal includes an antenna 62 which transmits and receives radio frequency signals that are transmitted over a lead 64 to conventional link electronics 66. Terminal 60 has an input 68 and an output 70 arranged as shown. The terminal comprises a conventional two-way, short-range, high-capacity intersatellite link which is known to those skilled in the art.

The preferred form of the invention also includes a conventional downlink transmitter 80 suitable for launching on core satellite 20. Transmitter 80 includes a transmitter module 82 which receives IF signals from processor 50, amplifies those signals and transforms them to radio frequency carrier signals suitable for transmission over a lead 84 to a conventional downlink antenna 86. The radio frequency carrier signals from antenna 86 are suitable for transmission to a conventional ground-based communication station 90. Transmitter 80 has an input 88 connected as shown.

The preferred form of the invention also includes a switch 100 deployable on satellite 20 and suitable for switching signals from output 46 to either input 52 of processor 50 or input 68 of link terminal 60. Such switches are well known to those skilled in the art and may take various forms. For example, switch 100 may be arranged as gates which allow signals from receiver 40 to proceed through terminal 60 and/or processor 50. In another form, switch 100 may be gates which apply power to portions of terminal 60 or processor 50 so that signals may be utilized by them. All of these possible forms of switch 100 are means for enabling signals from receiver 40 to be utilized by terminal 60 and/or processor 50.

The preferred form of the invention also includes another switch 110 like switch 100 deployable on core satellite 20 and suitable for switching signals to input 88 of downlink transmitter 80 from output 70 of link terminal 60 or output 54 of processor 50. Switch 110 may take additional forms similar to those described in connection with switch 100. The various forms of switch 110 comprise means for enabling signals from terminal 60 and/or processor 50 to be utilized by terminal 80.

Switches 100 and 110 may initiate switching or gating in response to information carried by signals, such as the signals received by receiver 40 and terminal 60. Such switches are well known.

In this application, signals include various characteristics of signals, such as signal carrier or envelope, and information or data embodied in the signals to be utilized.

The above-described apparatus facilitates the supplementation of the processing functions of satellite 20 by use of a supplemental satellite 200 which may be launched into orbital slot OS after satellite 20 is already in that orbital slot. The apparatus deployable on satellite 200 includes a processor 210 having an input 212 and an output 214. Processor 210 is suitable for processing unprocessed or semi-processed (e.g. channelized) IF signals received from core satellite 20 via terminal link 60. Various other types of processing may be performed by processor 210, including improved IF switching with selectable band widths and/or frequency translation and band width on-demand digital processing and/or cell switching. Such processors are well known.

Additional apparatus suitable for launching with satellite 200 includes an intersatellite communication link terminal 220 which may be identical to terminal link 60. Link terminal 220 includes an antenna 222 which transmits radio frequency signals over a lead 224 to conventional link electronics 226. Terminal 220 has an input 228 coupled to output 214 of processor 210 and has an output 230 coupled to input 212 of processor 210.

Link terminals 60 and 220 communicate with each other over a short range of distance within orbital slot OS which may typically be about 10 kilometers.

The preferred embodiment is used by placing the above-described components on core satellite 20 and launching the satellite into orbital slot OS. At some future time, when the marketplace shows a need for new services, supplemental satellite 200 is designed to implement the specific processing required to achieve the desired new services. Note that only the new processing is incorporated into satellite 200. The uplink receiver 40 and downlink transmitter 80 remain on core satellite 20 and are not needed in supplemental satellite 200. Supplemental satellite 200 is positioned in orbital slot OS near core satellite 20 and communicates with the core satellite via link terminal 60 and link terminal 220.

The foregoing embodiment of the invention allows a satellite system operator to defer the design of equipment for services offered in the future until new and different markets are identified and/or the required technology or protocols have time to mature. A spacecraft, such as satellite 20, can be launched and activated and then, through the use of supplemental satellite 200, its functionality can be altered or expanded to meet changing market conditions or operational requirements. In this way, an orbital slot, such as OS, can be populated with a core satellite having a productive lifetime which is protected from obsolescence.

By using the foregoing embodiment, processor 210 may be used to add different digital and IF process payload processing functionalities, to move network control functions into orbital slot OS and to add on-orbit information and database storage and access to orbital slot OS.

The preferred embodiment may be altered and modified without departing from the true spirit and scope of the invention as defined in the accompanying claims. For example, orbital slot OS may involve GEO, LEO, MEO or HEO orbits. The only requirement is that the supplemental satellite 200 be able to stationkeep in close proximity to core satellite 20 during its normal movements. Link terminal 60 and 220 may comprise various types of intersatellite links, including both radio frequency and laser links along with various multiplexing and modulation techniques that could be used to carry information. The points in the core satellites up-link and down-link signal path at which the signals or information to and from supplemental satellite 200 be extracted or introduced may be varied and modified from the positions shown and implemented by switches 100 and 110. Those skilled in the art will recognize the intermediate points in the core satellite's original processing flow may be used to extract signals to be sent to a supplemental satellite 200. The invention is not limited to the particular points illustrated by the placement of switches 100 and 110.

What is claimed is:

1. In a satellite communication system, improved apparatus for enhancing the processing capabilities of said system comprising in combination:

an uplink receiver deployable with a first satellite suitable for launching into an orbital slot and capable of receiving communication signals from a ground-based communication station;

a first processor deployable with said first satellite and capable of processing signals from said uplink receiver;

a first intersatellite communication link terminal deployable with said first satellite and capable of transmitting signals to a second processor deployable with a second satellite launched after said first satellite and capable of receiving signals processed by said second processor from a second intersatellite communication link terminal deployable with said second satellite;

a first switch deployable with said first satellite and enabling signals from said uplink receiver to be utilized by said first intersatellite communication link terminal or said first processor;

a downlink transmitter deployable with said first satellite capable of transmitting said signals to a ground-based communication station; and a second switch deployable with said first satellite and enabling signals from said first intersatellite communication link terminal or said first processor to be utilized by said downlink transmitter, whereby the processing capabilities of said first satellite can be enhanced by launching said second satellite after said first satellite is in said first orbital slot.

2. Apparatus, as claimed in claim 1, wherein said first and second switches initiate switching in response to information in at least one of said signals.

3. Apparatus, as claimed in claim 1, wherein said second satellite is capable of being launched into said orbital slot, whereby the processing supported at said orbital slot may be enhanced.

4. Apparatus, as claimed in claim 3, wherein said first intersatellite communication link terminal comprises a portion of a two way intersatellite link with sufficient range to enable communication between said first and second satellites and sufficient capacity to enable the processing and transmission of said signals within said orbital slot.

5. Apparatus, as claimed in claim 1, wherein said uplink receiver comprises an antenna and apparatus capable of converting from carrier frequency to intermediate frequency.

6. Apparatus, as claimed in claim 1, wherein said first processor comprises a bent pipe repeater capable of shifting the frequency of said signals received by said uplink receiver to a downlink frequency.

7. Apparatus, as claimed in claim 6, wherein said first and second switches initiate switching in response to information in at least one of said signals.

8. In a satellite communication system, improved apparatus for enhancing the processing capabilities of said system comprising in combination:

an uplink receiver deployable with a first satellite suitable for launching into an orbital slot capable of receiving communication signals from a ground-based communication station;

a first processor deployable with said first satellite and capable of processing signals from said uplink receiver;

a first intersatellite communication link terminal deployable with said first satellite and capable of transmitting signals within said orbital slot;

a second processor deployable with a second satellite launched after said first satellite into said orbital slot and capable of processing signals transmitted by said first intersatellite communication link terminal;

a second intersatellite communication link terminal deployable with said second satellite and capable of transmitting signals processed by said second processor to said first intersatellite communication link terminal;

a first switch deployable with said first satellite and enabling signals from said uplink receiver to be utilized by said first intersatellite communication link terminal or said first processor;

a downlink transmitter deployable with said first satellite and capable of transmitting signals to a ground-based communication station; and a second switch deployable with said first satellite and enabling signals from said first intersatellite communication link terminal or said first processor to be utilized by said downlink transmitter, whereby the processing capabilities of said first satellite can be enhanced by launching said second satellite after said first satellite is in said first orbital slot.

9. Apparatus, as claimed in claim 8, wherein said uplink receiver comprises an antenna and apparatus capable of converting the frequency of said signals received by said uplink receiver from carrier frequency to intermediate frequency.

10. Apparatus, as claimed in claim 8, wherein said first processor comprises a bent pipe repeater capable of shifting the frequency of said signals received by said uplink receiver to a downlink frequency.

11. Apparatus, as claimed in claim 8, wherein said first and second intersatellite communication link terminals comprise a two way intersatellite link with sufficient range to enable communication between said first and second satellites and sufficient capacity to enable the processing and transmission of said signals within said orbital slot.

12. In a satellite communication system, improved apparatus for enhancing the processing capabilities of said system comprising in combination:

uplink receiver means deployable with a first satellite suitable for launching into an orbital slot, said uplink receiver means being for receiving communication signals from a ground-based communication station;

first processor means deployable with said first satellite for processing said signals from said uplink receiver means;

first intersatellite communication link terminal means deployable with said first satellite for transmitting said signals to a second processor deployable with a second satellite launched after said first satellite and for receiving said signals processed by said second processor from a second intersatellite communication link terminal deployable with said second satellite;

first means deployable with said first satellite for enabling signals from said uplink receiver means to be utilized by said first intersatellite communication link terminal means or said first processor means;

downlink transmitter means deployable with said first satellite for transmitting said signals to a ground-based communication station; and second means deployable with said first satellite for enabling signals from said first intersatellite communication link terminal means or said first processor means to be utilized by said downlink transmitter means, whereby the processing capabilities of said first satellite can be enhanced by launching said second satellite after said first satellite is in said orbital slot.

13. Apparatus, as claimed in claim 12, wherein said first and second means for enabling comprise means for initiating switching in response to information in said signals.

14. Apparatus, as claimed in claim 12, wherein said second satellite is capable of being launched into said orbital slot, whereby the processing supported at said orbital slot may be enhanced.

15. Apparatus, as claimed in claim 14, wherein said first intersatellite communication link terminal means comprises a portion of two way intersatellite link means with sufficient range for enabling communication between said first and second satellites and with sufficient capacity for enabling the processing and transmission of said signals within said orbital slot.

16. Apparatus, as claimed in claim 12, wherein said uplink receiver means comprises an antenna and means for converting from carrier frequency to intermediate frequency.

17. Apparatus, as claimed in claim 12, wherein said first processor means comprises bent pipe repeater means for shifting the frequency of said signals to a downlink frequency.

18. In a satellite communication system, improved apparatus for enhancing the processing capabilities of said system comprising in combination:
    uplink receiver means deployable with a first satellite suitable for launching into an orbital slot, said uplink receiver means being for receiving communication signals from a ground-based communication station;
    first processor means deployable with said first satellite for processing said signals from said uplink receiver means;
    first intersatellite communication link terminal means deployable with said first satellite for transmitting said signals;
    second processor means deployable with a second satellite launched after said first satellite into said orbital slot for processing said signals transmitted by said first intersatellite communication link terminal means;
    second intersatellite communication link terminal means deployable with said second satellite for transmitting signals processed by said second processor means to said first intersatellite communication link terminal means;
    first means deployable with said first satellite for enabling signals from said uplink receiver means to be utilized by said first intersatellite communication link terminal means or said first processor means;
    downlink transmitter means deployable with said first satellite for transmitting said signals to a ground-based communication station; and
    second means deployable with said first satellite for enabling signals from said first intersatellite communication link terminal means or said first processor means to be utilized by said downlink transmitter means, whereby the processing capabilities of said first satellite can be enhanced by launching said second satellite after said first satellite is in said first orbital slot.

19. Apparatus, as claimed in claim 18, wherein said first and second means for enabling comprise means for initiating switching in response to information in said signals.

20. Apparatus, as claimed in claim 18, wherein said uplink receiver means comprises an antenna and means for converting from carrier frequency to intermediate frequency.

21. Apparatus, as claimed in claim 18, wherein said first processor means comprises bent pipe repeater means for shifting the frequency of said signals to a downlink frequency.

22. Apparatus, as claimed in claim 18, wherein said first and second intersatellite communication link terminal means comprise two way intersatellite link means with sufficient range for enabling communication between said first and second satellites and sufficient capacity for enabling the processing and transmission of said signals within said orbital slot.

23. In a satellite communication system comprising an uplink receiver deployable with a first satellite, a downlink transmitter deployable with said first satellite, a first processor deployable with said first satellite, and a first intersatellite communication link terminal deployable with said first satellite, an improved method of enhancing the processing capability of the system comprising in combination the steps of:
    receiving communication signals at said uplink receiver;
    enabling signals received at said uplink receiver to be utilized by said first processor or said first intersatellite communication link terminal;
    receiving from a remote location communication signals at said first intersatellite communication link terminal;
    enabling signals from said first intersatellite communication link terminal or from said first processor to be utilized by said downlink transmitter, whereby said signals may be processed by said first processor on said first satellite or transmitted to a second satellite by said first intersatellite communication link terminal for processing by a second processor deployed with said second satellite so that the processing capabilities of said first satellite may be enhanced.

24. A method, as claimed in claim 23, wherein said step of enabling signals received at said uplink receiver comprises the step of enabling in response to information in at least one of said signals.

25. A method, as claimed in claim 24, wherein said step of enabling said signals from said first intersatellite communication link terminal comprises the step of enabling in response to information in at least one of said signals.

26. A method, as claimed in claim 23, wherein said signals received at said uplink receiver have a carrier frequency and wherein said step of receiving communication signals at said uplink receiver comprises the step of converting said carrier frequency to an intermediate frequency.

27. A method, as claimed in claim 23, and further comprising the step of performing bent pipe repeater processing in said processor.

28. A method, as claimed in claim 23, wherein said satellite communication system further comprises a second intersatellite communication link terminal deployable with a second satellite and a second processor deployable with said second satellite and wherein said method further comprising the steps of:
    transmitting said signals from said first intersatellite communication link terminal to said second intersatellite communication link terminal;
    processing said communication signals in said second processor; and
    transmitting said signals processed by said second processor from said second intersatellite communication link terminal to said first intersatellite communication link terminal.

* * * * *